US010789778B1

(12) United States Patent
Li et al.

(10) Patent No.: US 10,789,778 B1
(45) Date of Patent: Sep. 29, 2020

(54) SYSTEMS AND METHODS FOR DISPLAYING AUGMENTED-REALITY OBJECTS

(71) Applicant: Facebook Technologies, LLC, Menlo Park, CA (US)

(72) Inventors: Wai-Ho Li, Sunnyvale, CA (US); Eli Alejandro Guerron, Redmond, CA (US); Vasiliy Kuznetsov, San Carlos, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/213,916

(22) Filed: Dec. 7, 2018

(51) Int. Cl.
*G06T 19/00* (2011.01)
*G06K 9/00* (2006.01)
*G06N 20/00* (2019.01)
*G06K 9/32* (2006.01)

(52) U.S. Cl.
CPC ........ *G06T 19/006* (2013.01); *G06K 9/00375* (2013.01); *G06K 9/3208* (2013.01); *G06K 9/3275* (2013.01); *G06N 20/00* (2019.01)

(58) Field of Classification Search
None
See application file for complete search history.

(56) References Cited

U.S. PATENT DOCUMENTS 9,165,318 B1 * 10/2015 Pauley ............... G06Q 30/0643

FOREIGN PATENT DOCUMENTS

WO    WO-2017149315 A1 * 9/2017 ......... G06K 9/00281

OTHER PUBLICATIONS

"GrowRing", URL: http://growring.co/, 5 pages.

* cited by examiner

*Primary Examiner* — YuJang Tswei
(74) *Attorney, Agent, or Firm* — FisherBroyles, LLP

(57) ABSTRACT

A computer-implemented method for displaying augmented-reality objects may include matching, by one or more cameras of an augmented-reality system, a user's hand with a predefined silhouette model with weighted features. The method may also include identifying a location on the user's hand to place an augmented-reality object. In addition, the method may include tracking, by the augmented-reality system, an orientation of the location on the user's hand using the weighted features. Furthermore, the method may include displaying, by the augmented-reality system, the augmented-reality object on the user's hand based on the orientation of the location on the user's hand. Various other methods, systems, and computer-readable media are also disclosed.

20 Claims, 10 Drawing Sheets

Silhouette Model
200

SYSTEMS AND METHODS FOR DISPLAYING AUGMENTED-REALITY OBJECTS

BACKGROUND

Augmented-reality systems allow users to experience digital features within a real-world environment, often enhanced so that the digital features interact with the real-world environment. For example, sounds may be digitally enhanced or created to play in conjunction with real-world ambience. In other examples, users may use digital screens or displays to view digital constructs in the context of real-world images. For instance, a user may digitally try on clothing and accessories without needing to physically wear them.

To enhance user experiences, augmented reality often requires digital constructs to match and react to the real world in real time. For example, when a user tries on a digital shirt, the shirt may visually move to match the user's movements so that the user can see it from different angles. When digital constructs do not accurately adjust to real-world differences, such as differences in body sizes or different angles, users may notice the differences and may experience a disconnect with an augmented-reality system. In order to make these adjustments more accurate, some augmented-reality systems may use complex calculations to ensure the digital constructs match the real-world environment. However, these complex calculations may require a long time to process, resulting in substantial lag time when displayed to the user. Traditional methods may be limited by computational complexity to two-dimensional rendering of digital objects. Therefore, better methods of quickly computing changing real-world images in real time are needed to improve the synchronization of augmented-reality objects with a real-world environment.

SUMMARY

As will be described in greater detail below, the instant disclosure describes various systems and methods for displaying augmented-reality objects by utilizing weighted features to match a user's hand with a silhouette model for improved tracking of the user's hand and, therefore, improved accuracy of displaying the augmented-reality objects. In one example, a method for displaying augmented-reality objects may include matching, by one or more cameras of an augmented-reality system, a user's hand with a predefined silhouette model with weighted features. The method may also include identifying a location on the user's hand to place an augmented-reality object. In addition, the method may include tracking, by the augmented-reality system, an orientation of the location on the user's hand using the weighted features. Furthermore, the method may include displaying, by the augmented-reality system, the augmented-reality object on the user's hand based on the orientation of the location on the user's hand.

In one embodiment, the augmented-reality system may include a mobile computing device. Additionally or alternatively, the augmented-reality system may include a camera and/or a visual display.

In some examples, the weighted features may include regions of the silhouette model with greater weight than other regions used to calculate an accuracy of matching the user's hand with the silhouette model, wherein a weighted feature includes the location on the user's hand to place the augmented-reality object, a contour of the silhouette model, and/or an expected anatomical feature of the user's hand. In these examples, the weighted feature may include a finger of the user's hand selected as the location on the user's hand and weighted with greater weight than other fingers of the user's hand.

In some embodiments, matching the user's hand with the silhouette model may include prompting, from the augmented-reality system, the user to position the user's hand to match the silhouette model and detecting that the user's hand matches the silhouette model within a predefined accuracy rating. In these embodiment, the above method may further include prompting the user to improve the match between the user's hand and the silhouette model to meet the predefined accuracy rating. Additionally or alternatively, in one embodiment, matching the user's hand with the silhouette model may include applying the silhouette model as a mask to an image of the user's hand and identifying an area of the image comprising the user's hand within the mask.

In one example, identifying the location on the user's hand may include prompting the user to select the location to place the augmented-reality object and detecting the selection of the location. In this example, the selection of the location may include a selection of the location on an image of the user's hand on a visual display of the augmented-reality system. Additionally or alternatively, the selection of the location may include a motion by the user's other hand to indicate the location on the user's hand.

In some examples, identifying the location on the user's hand may include identifying the augmented-reality object. In these examples, identifying the location on the user's hand may also include determining a default location to place the augmented-reality object based on a type of the augmented-reality object.

In one embodiment, tracking the orientation of the location on the user's hand may include annotating image data captured by the augmented-reality system using a machine-learning model to estimate, based on the weighted features, the orientation of the location on the user's hand. In this embodiment, tracking the orientation of the location on the user's hand may further include using a computer-vision method to refine the estimated orientation of the location on the user's hand.

In some embodiments, displaying the augmented-reality object on the user's hand may include matching an orientation of the augmented-reality object to the orientation of the location on the user's hand and displaying the augmented-reality object, rotated to match the orientation of the location on the user's hand, at the location on the user's hand. In these embodiments, the orientation of the augmented-reality object may include a size of the augmented-reality object, an angle of the augmented-reality object, and/or a relative position of the augmented-reality object.

In addition, a corresponding augmented-reality system for displaying augmented-reality objects may include several modules stored in memory, including a matching module that matches, by one or more cameras, a user's hand with a predefined silhouette model with weighted features. The augmented-reality system may also include an identification module that identifies a location on the user's hand to place an augmented-reality object. Additionally, the augmented-reality system may include a tracking module that tracks an orientation of the location on the user's hand using the weighted features. Furthermore, the augmented-reality system may include a display module that displays the augmented-reality object on the user's hand based on the orientation of the location on the user's hand. Finally, the augmented-reality system may include one or more hardware processors that execute the matching module, the identification module, the tracking module, and the display module.

In some examples, the above-described method may be encoded as computer-readable instructions on a computer-readable medium. For example, a computer-readable medium may include one or more computer-executable instructions that, when executed by at least one processor of a computing device, may cause the computing device to match, by one or more cameras of an augmented-reality system, a user's hand with a predefined silhouette model with weighted features. The instructions may also cause the computing device to identify a location on the user's hand to place an augmented-reality object. Furthermore, the instructions may cause the computing device to track an orientation of the location on the user's hand using the weighted features. Finally, the instructions may cause the computing device to display the augmented-reality object on the user's hand based on the orientation of the location on the user's hand.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
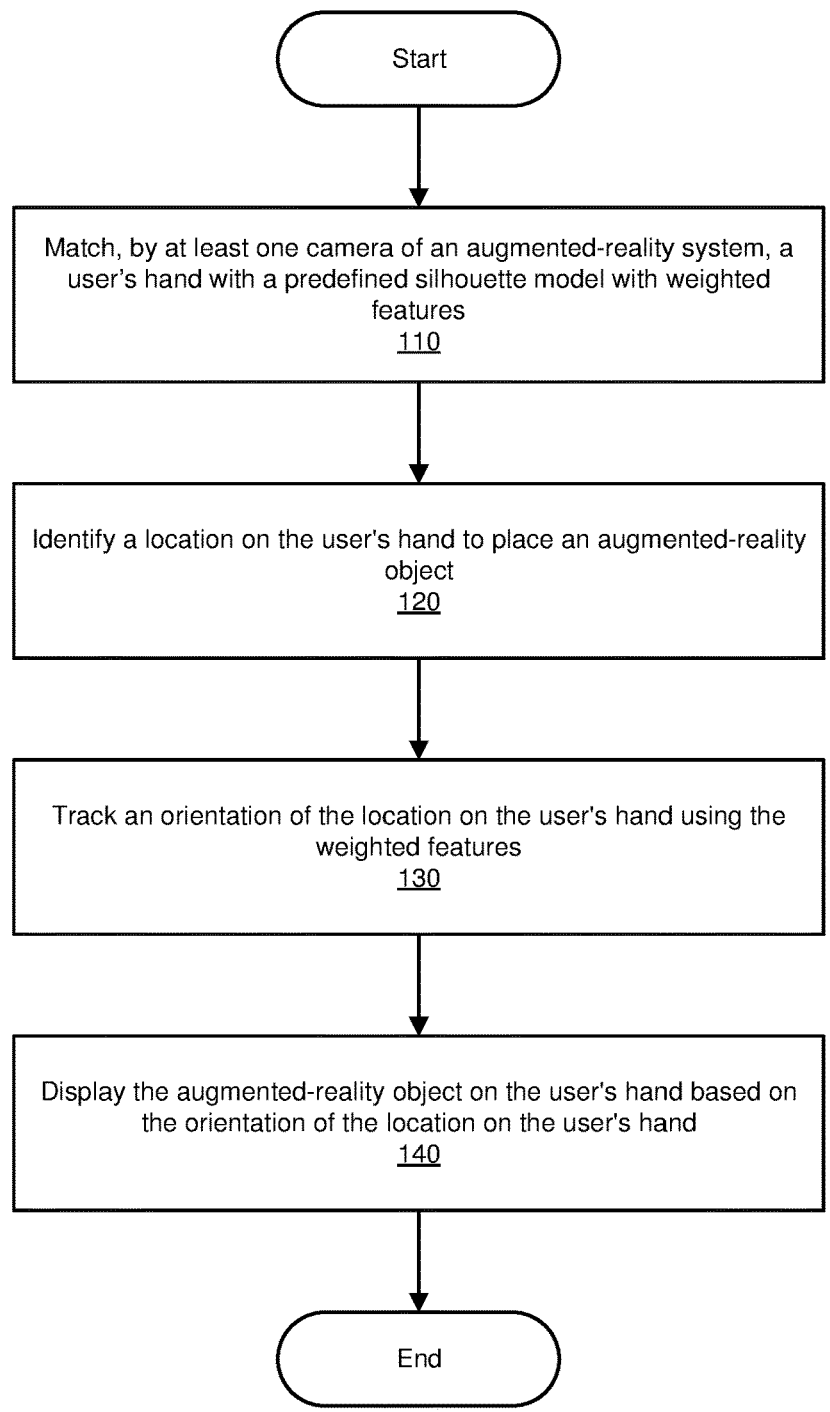
FIG. 1 is a flow diagram of an exemplary method for displaying augmented-reality objects.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for displaying augmented-reality objects. As will be explained in greater detail below, embodiments of the instant disclosure may predefine a silhouette model to calibrate the tracking of a user's hand via one or more cameras and improve the speed and accuracy of displaying augmented-reality objects on the user's hand. The disclosed systems and methods may first ensure that the user's hand is placed to match the predefined silhouette model by capturing weighted features. The systems and methods described herein may then identify a specific location on the user's hand to place an augmented-reality object. For example, the disclosed systems and methods may enable the user to select the location or detect a default location based on the type of augmented-reality object being placed on the user's hand. By closely tracking weighted features on the user's hand, the disclosed systems and methods may more accurately track the orientation of the location on the user's hand. The disclosed systems and methods may then display the augmented-reality object on the user's hand by matching the orientation of the augmented-reality object with the orientation of the location on the user's hand.

In addition, the systems and methods described herein may improve the functioning of a computing device, such as an augmented-reality device, by combining machine-learning models with computer-vision techniques to improve the speed and accuracy of calculating the orientation of an augmented-reality object. These systems and methods may also improve the fields of augmented and artificial reality by improving the tracking of a user's hand using image data and weighted features and by reducing the need for additional wearable trackers. Thus, the disclosed systems and methods may improve the robustness of matching augmented-reality assets with real-world features.

The following will provide, with reference to FIG. 1, detailed descriptions of computer-implemented methods for displaying augmented-reality objects. Detailed descriptions of an exemplary silhouette model will be provided in connection with FIG. 2. In addition, detailed descriptions of an exemplary augmented-reality system will be provided in connection with FIG. 3. Detailed descriptions of an exemplary usage of an augmented-reality system will be provided in connection with FIGS. 4-7. Furthermore, detailed descriptions of an exemplary augmented-reality system analyzing image data to display an exemplary augmented-reality object will be provided in connection with FIGS. 8-10.

Embodiments of the instant disclosure may include or be implemented in conjunction with an augmented-reality system. Augmented or artificial reality (AR) is a form of reality that has been adjusted in some manner before presentation to a user, which may include, e.g., a virtual reality (VR), a mixed reality (MR), a hybrid reality, or some combination and/or derivatives thereof. Augmented-reality content may include generated content combined with captured (e.g., real-world) content. The augmented-reality content may include video, audio, haptic feedback, or some combination thereof, any of which may be presented in a single channel or in multiple channels (such as stereo video that produces a three-dimensional effect to the viewer). Additionally, in some embodiments, augmented reality may also be associated with applications, products, accessories, services, or some combination thereof, that are used to, e.g., create content in an augmented reality and/or are otherwise used in (e.g., perform activities in) an augmented reality. The augmented-reality system that provides the augmented-reality content may be implemented on various platforms, including a head-mounted display (HMD) connected to a host computer system, a standalone HMD, a mobile device or computing system, or any other hardware platform capable of providing artificial reality content to one or more viewers.

FIG. 1 is a flow diagram of an exemplary computer-implemented method 100 for displaying augmented-reality objects. The steps shown in FIG. 1 may be performed by any suitable computer-executable code and/or computing system, including the augmented-reality system illustrated in FIG. 8. In one example, each of the steps shown in FIG. 1 may represent an algorithm whose structure includes and/or is represented by multiple sub-steps, examples of which will be provided in greater detail below.

Figure 8:
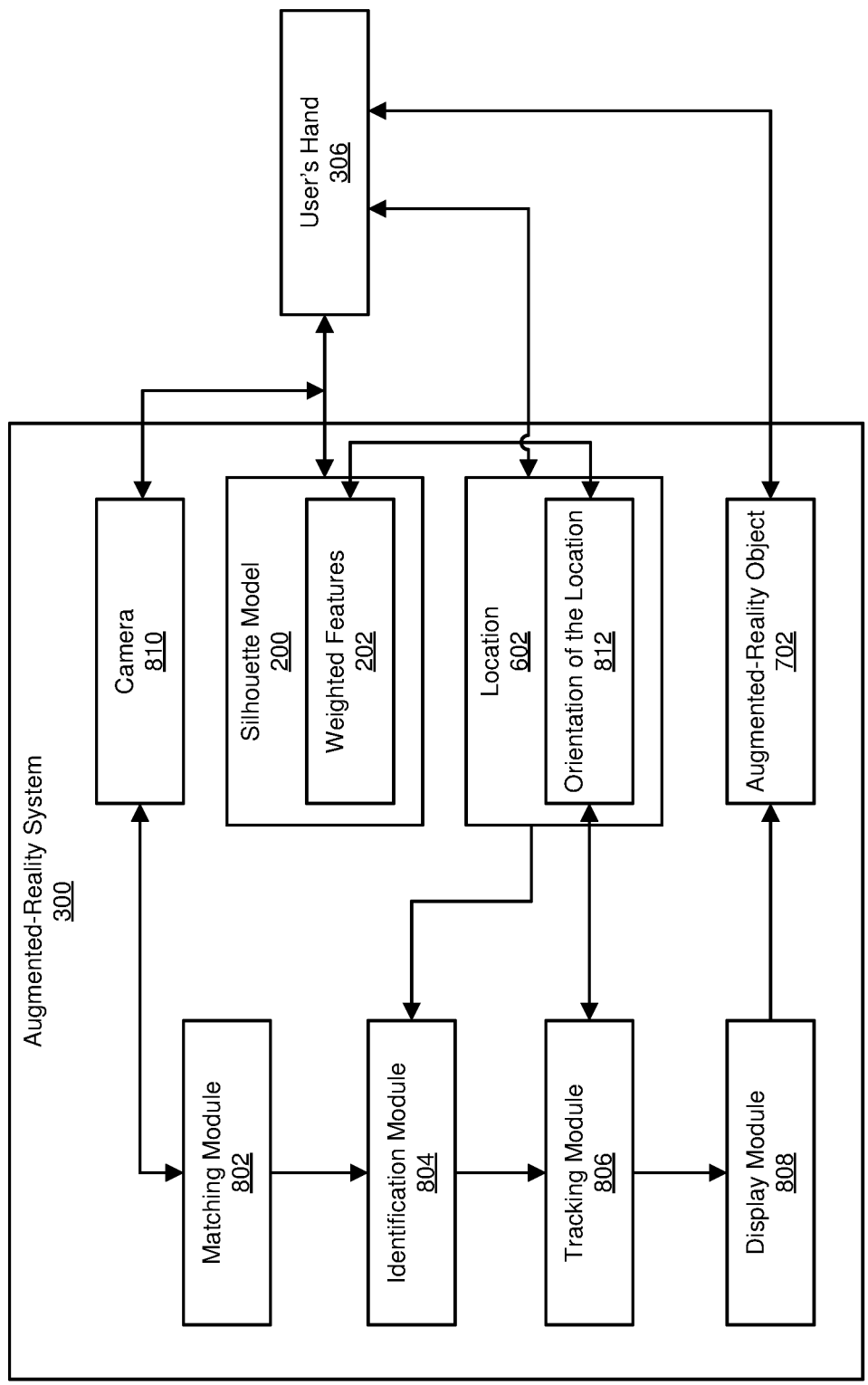
FIG. 8 is a block diagram of an exemplary augmented-reality system for displaying augmented-reality objects.

As illustrated in FIG. 1, at step 110, one or more of the systems described herein may match, by one or more cameras of an augmented-reality system, a user's hand with a predefined silhouette model with weighted features. For example, FIG. 8 is a block diagram of an exemplary augmented-reality system 300 for displaying augmented-reality objects. As illustrated in FIG. 8, a matching module 802 may, as part of augmented-reality system 300, match, by a camera 810, a user's hand 306 with a predefined silhouette model 200 with weighted features 202.

The systems described herein may perform step 110 in a variety of ways. For example, augmented-reality system 300 of FIG. 8 may include a mobile computing device, such as a mobile computing device 302 illustrated in FIG. 3, camera 810, and/or a visual display 304. Additionally or alternatively, augmented-reality system 300 may include virtual reality devices, such as VR glasses, that may provide visual information to a user. Furthermore, augmented-reality system 300 may execute augmented-reality software applications, such as an advertisement that uses augmented reality to display products.

In some embodiments, weighted features 202 may include regions of silhouette model 200 with greater weight than other regions used to calculate an accuracy of matching user's hand 306 with silhouette model 200. In these embodiments, a weighted feature may include a location 602 on user's hand 306 to place an augmented-reality object 702, a contour of silhouette model 200, and/or an expected anatomical feature of user's hand 306. In these embodiments, silhouette model 200 may be predefined to ensure major points of articulation of user's hand 306 are visible to camera 810 for calibrating the match between silhouette model 200 and user's hand 306.

Figure 2:
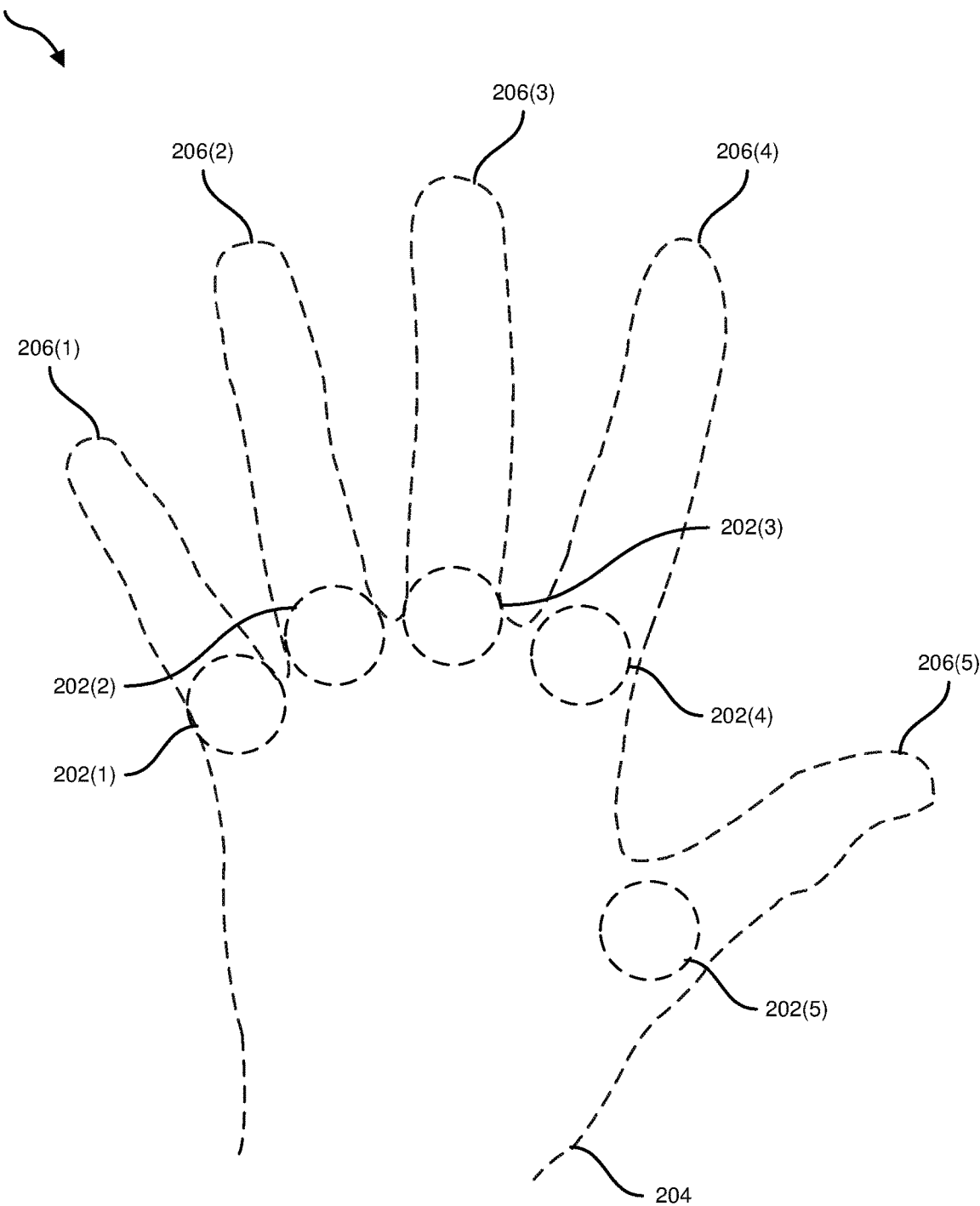
FIG. 2 illustrates an exemplary silhouette model for calibrating hand tracking.

As illustrated in FIG. 2, silhouette model 200 may be predefined to include weighted features 202(1), 202(2), 202(3), 202(4), and 202(5). For example, weighted features 202(1)-(5) may be selected to represent the knuckles or joints connecting fingers 206(1), 206(2), 206(3), 206(4), and 206(5) to the palm of the hand. In this example, knuckles and joints may be easier to detect and match to an image of user's hand 306. The knuckles may also be more useful to track during movement of user's hand 306 as they may be more stable than other features of user's hand 306. Additionally, silhouette model 200 may include a contour 204 that represents an outline of a generic hand.

Figure 6:
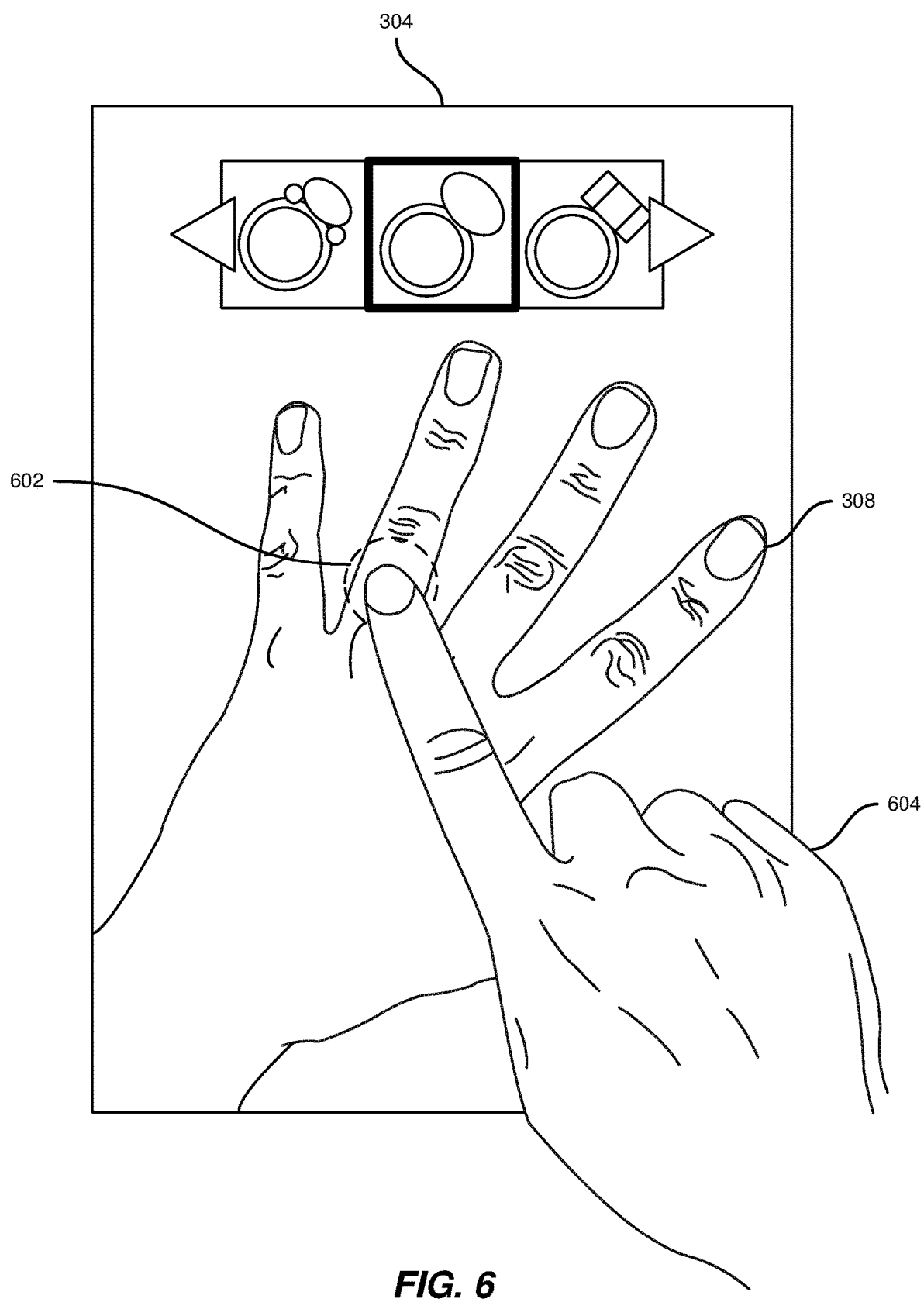
FIG. 6 illustrates an exemplary selection of a location to place an augmented-reality object.

In one embodiment, weighted features 202 of FIG. 8 may include a finger of user's hand 306 selected as location 602 and weighted with greater weight than other fingers of user's hand 306. For example, as illustrated in FIG. 6, a ring finger may be selected as location 602 to wear a ring, thereby corresponding to weighted feature 202(2) and/or finger 206(2) of silhouette model 200 in FIG. 2. Augmented-reality system 300 may then weigh finger 206(2) more heavily than fingers 206(1), 206(3), 206(4), and 206(5) during the initial matching and/or the subsequent tracking of user's hand 306.

In the above examples, weighting some areas more heavily than other areas of user's hand 306 may increase the robustness and accuracy of matching location 602 for placement of augmented-reality object 702. The process of weighting certain features may also reduce errors during movement of user's hand 306 and/or errors due to differences in individual users' hand shapes and sizes. For example, by weighing the edges and pixels around location 602 more than other pixels in an image, augmented-reality system 300 may anchor the image using the weighted features, the edges of the finger, and/or other key points. In some examples, the user may select preferred weighted features to track.

Figure 3:
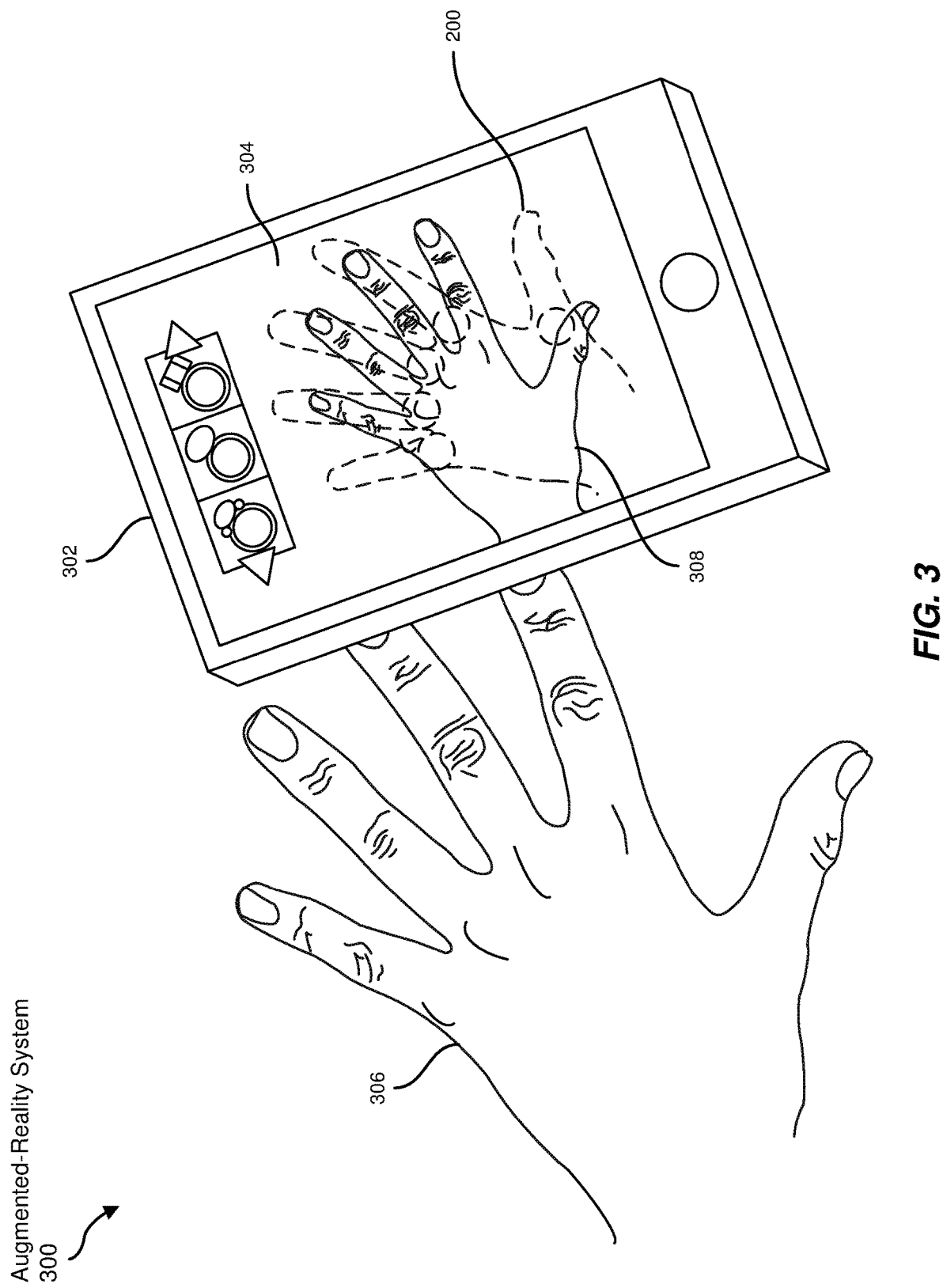
FIG. 3 illustrates the use of an exemplary augmented-reality system.

As shown in FIG. 3, a user may then use mobile computing device 302 to capture an image 308 of user's hand 306. Although not illustrated, mobile computing device 302 may include camera 810 with the capability to capture real-time images or video of user's hand 306 and relay them to the user via visual display 304. The user may then attempt to match user's hand 306 with silhouette model 200 displayed on the screen of mobile computing device 302.

In some embodiments, matching module 802 of FIG. 8 may match user's hand 306 with silhouette model 200 by prompting, from augmented-reality system 300, the user to position user's hand 306 to match silhouette model 200. Additionally, matching module 802 may detect that user's hand 306 matches silhouette model 200 within a predefined accuracy rating. Additionally or alternatively, augmented-reality system 300 may prompt the user to improve the match between user's hand 306 and silhouette model 200 to meet the predefined accuracy rating.

Figure 9:
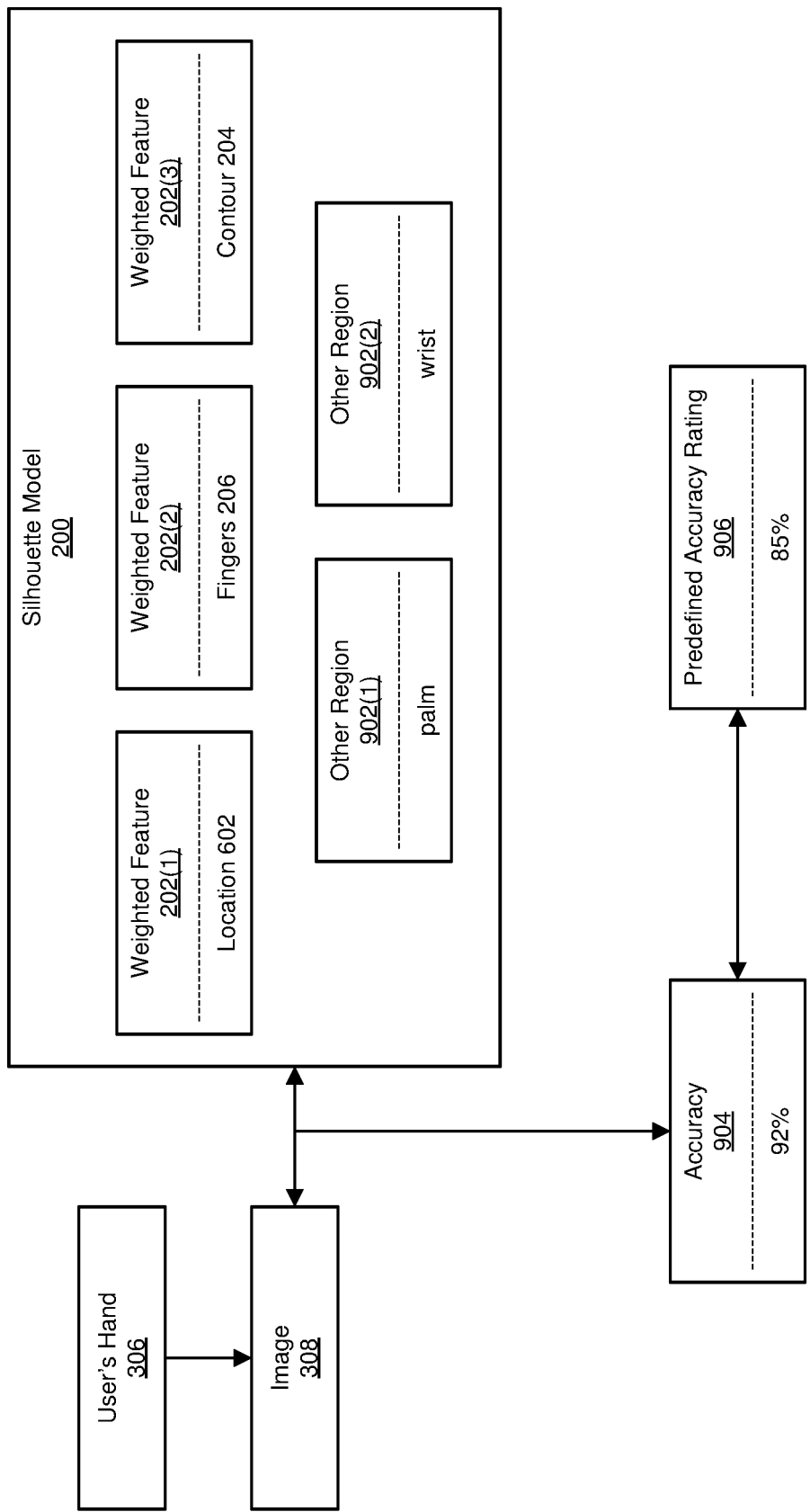
FIG. 9 is a block diagram of an exemplary calculation of the accuracy of a match between a user's hand and an exemplary silhouette model.

As shown in FIG. 9, silhouette model 200 may include weighted features 202(1), 202(2), and 202(3) that include location 602, fingers 206, and contour 204. Silhouette model 200 may also include other regions 902(1) and 902(2) that include features like a palm and a wrist, which are weighted less heavily. Augmented-reality system 300 may then attempt to match image 308 of user's hand 306 to silhouette model 200 to determine an accuracy 904 of 92% between image 308 and silhouette model 200. With a predefined accuracy rating 906 of 85% set as the minimum acceptable accuracy of the match, augmented-reality system 300 may determine image 308 is a match to silhouette model 200.

Alternatively, although not illustrated in FIG. 9, if accuracy 904 fails to meet predefined accuracy rating 906, augmented-reality system 300 may prompt the user to improve the match until accuracy 904 falls within an acceptable range. Additionally, fingers 206 may be weighted more heavily than other regions 902(1) and 902(2) in the example of FIG. 9 for specific augmented-reality objects such as finger rings. In alternative examples, augmented-reality object 702 may represent other accessories, such as bracelets or wristwatches, and other region 902(2) may become a weighted feature due to the importance of tracking a wrist as location 602 to wear the object.

In one embodiment, matching module 802 may match user's hand 306 with silhouette model 200 by applying silhouette model 200 as a mask to image 308 of user's hand 306. In this embodiment, matching module 802 may then identify an area of image 308 that includes user's hand 306 within the mask. For example, augmented-reality system 300 may detect skin-colored pixels in image 308 and compare the pixels to the placement of silhouette model 200. Additionally or alternatively, augmented-reality system 300 may detect a contour of user's hand 306 within image 308 and map it to contour 204 of silhouette model 200.

Figure 4:
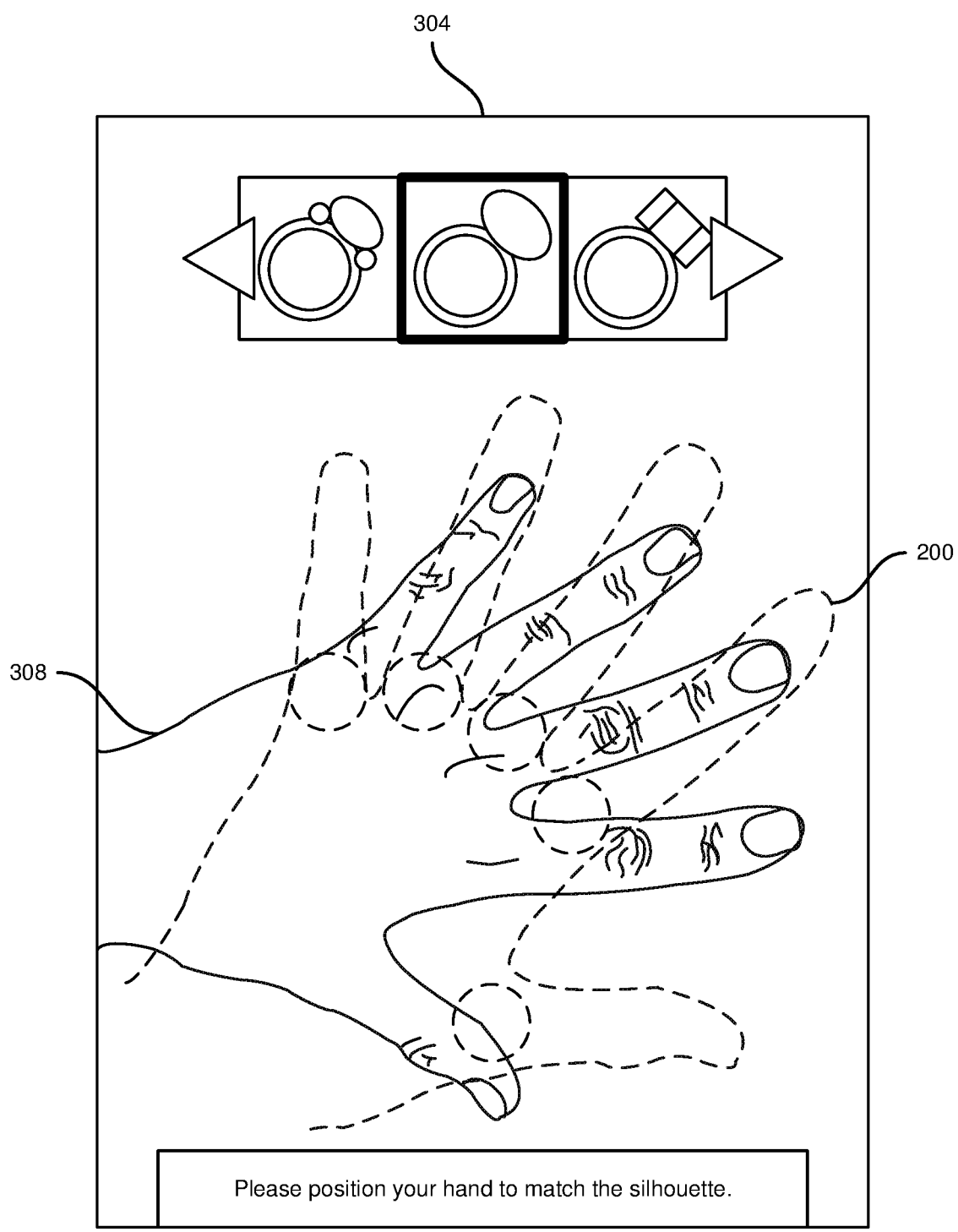
FIG. 4 illustrates an exemplary attempt to match a user's hand with an exemplary silhouette model.
Figure 5:
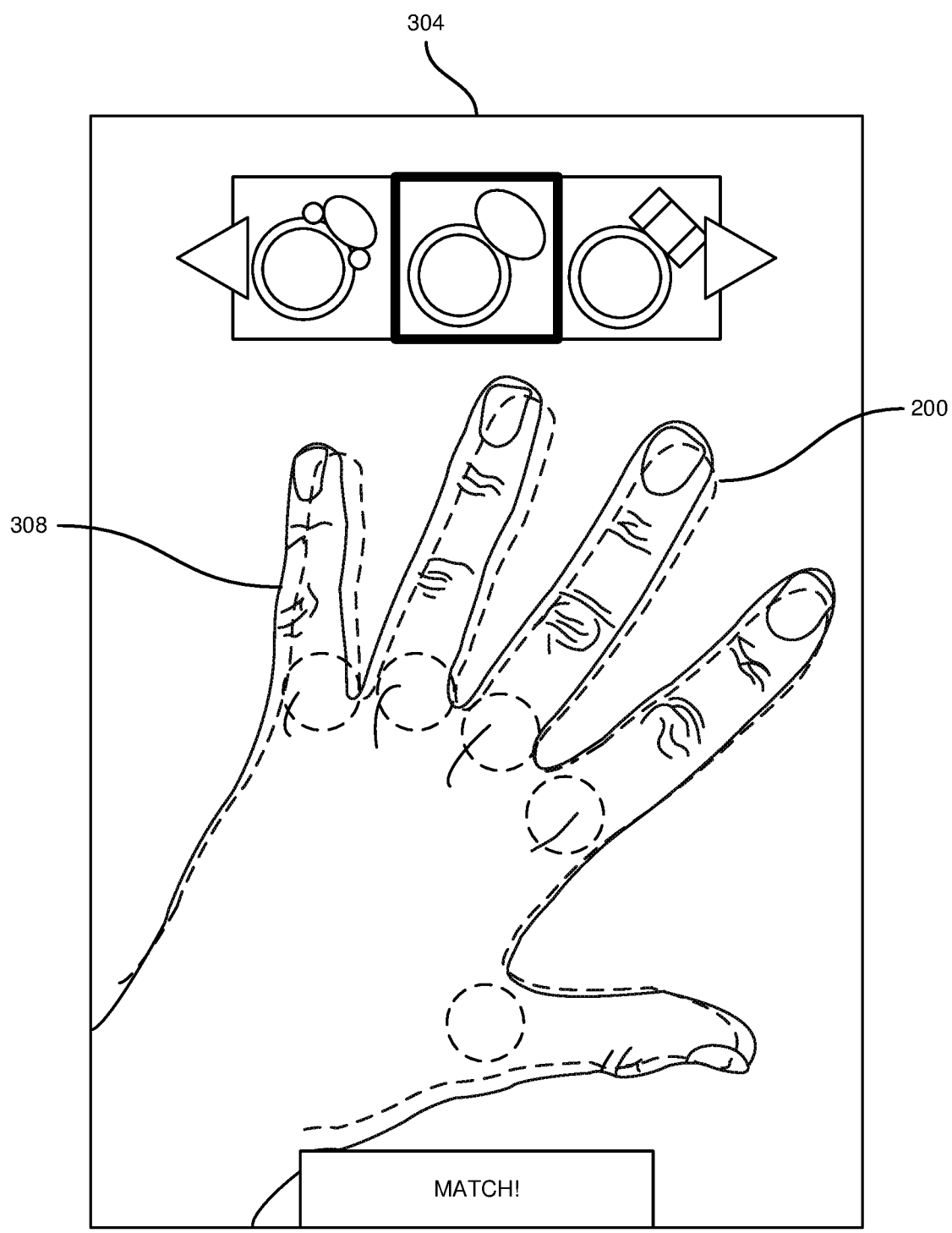
FIG. 5 illustrates an exemplary match between a user's hand with an exemplary silhouette model.

As illustrated in FIGS. 4 and 5, image 308 of user's hand 306 may be overlaid onto silhouette model 200 to compare weighted features. In the example of FIG. 4, augmented-reality system 300 may determine that image 308 has a low accuracy of matching silhouette model 200, and a prompt may appear on visual display 304 to encourage the user to match their hand to silhouette model 200. In the example of FIG. 5, augmented-reality system 300 may determine that image 308 matches silhouette model 200 to an acceptable accuracy and display a message to inform the user of the match.

Returning to FIG. 1, at step 120, one or more of the systems described herein may identify a location on the user's hand to place an augmented-reality object. For example, an identification module 804 may, as part of augmented-reality system 300 in FIG. 8, identify location 602 to place augmented-reality object 702.

The systems described herein may perform step 120 in a variety of ways. In some embodiments, identification module 804 may identify location 602 by prompting the user to select location 602 to place augmented-reality object 702. In these embodiments, identification module 804 may then detect the selection of location 602. Additionally, in some embodiments, the selection of location 602 may include a selection of location 602 on image 308 on visual display 304 of augmented-reality system 300 and/or may include a motion by the user's other hand to indicate location 602 on user's hand 306. For example, as illustrated in FIG. 6, a user's other hand 604 may select location 602 on image 308 showing user's hand 306 on visual display 304. In this example, image 308 may display dots on each finger where a ring may be placed and prompt the user to select one on visual display 304, which may have tactile sensors. Alternatively, the user may select any potential location on image 308 that could fit augmented-reality object 702. In other examples, camera 810 may capture a motion, such as a pointing motion, by user's other hand 604 on user's hand 306, rather than image 308. In these examples, augmented-reality system 300 may interpret the motion as selecting location 602.

In one embodiment, identification module 804 may identify location 602 by identifying augmented-reality object 702 and determining a default location to place augmented-reality object 702 based on a type of augmented-reality object 702. For example, augmented-reality object 702 may represent an engagement ring as illustrated in FIGS. 4-7, and identification module 804 may determine that engagement rings are typically worn on the ring finger. In this example, identification module 804 may automatically set location 602 as the ring finger of user's hand 306.

Returning to FIG. 1, at step 130, one or more of the systems described herein may track, by the augmented-reality system, an orientation of the location on the user's hand using the weighted features. For example, a tracking module 806 may, as part of augmented-reality system 300 in FIG. 8, track an orientation of the location 812 using weighted features 202.

The systems described herein may perform step 130 in a variety of ways. In one embodiment, tracking module 806 may track orientation of the location 812 by annotating image data captured by augmented-reality system 300 using a machine-learning model to estimate, based on weighted features 202, orientation of the location 812. In this embodiment, tracking module 806 may also use a computer-vision method to refine estimated orientation of the location 812.

As used herein, the term "machine-learning model" generally refers to a computational algorithm that may learn from data in order to make predictions. Examples of machine-learning models may include, without limitation, support vector machines, neural networks, clustering models, decision trees, classifiers, deep learning models, variations or combinations of one or more of the same, and/or any other suitable model. The term "computer-vision method," as used herein, generally refers to a method of analyzing digital images and/or video to extract important information and recognize objects. Examples of computer-vision methods may include optical flow, contour matching, pattern recognition, and/or any other suitable method.

Figure 10:
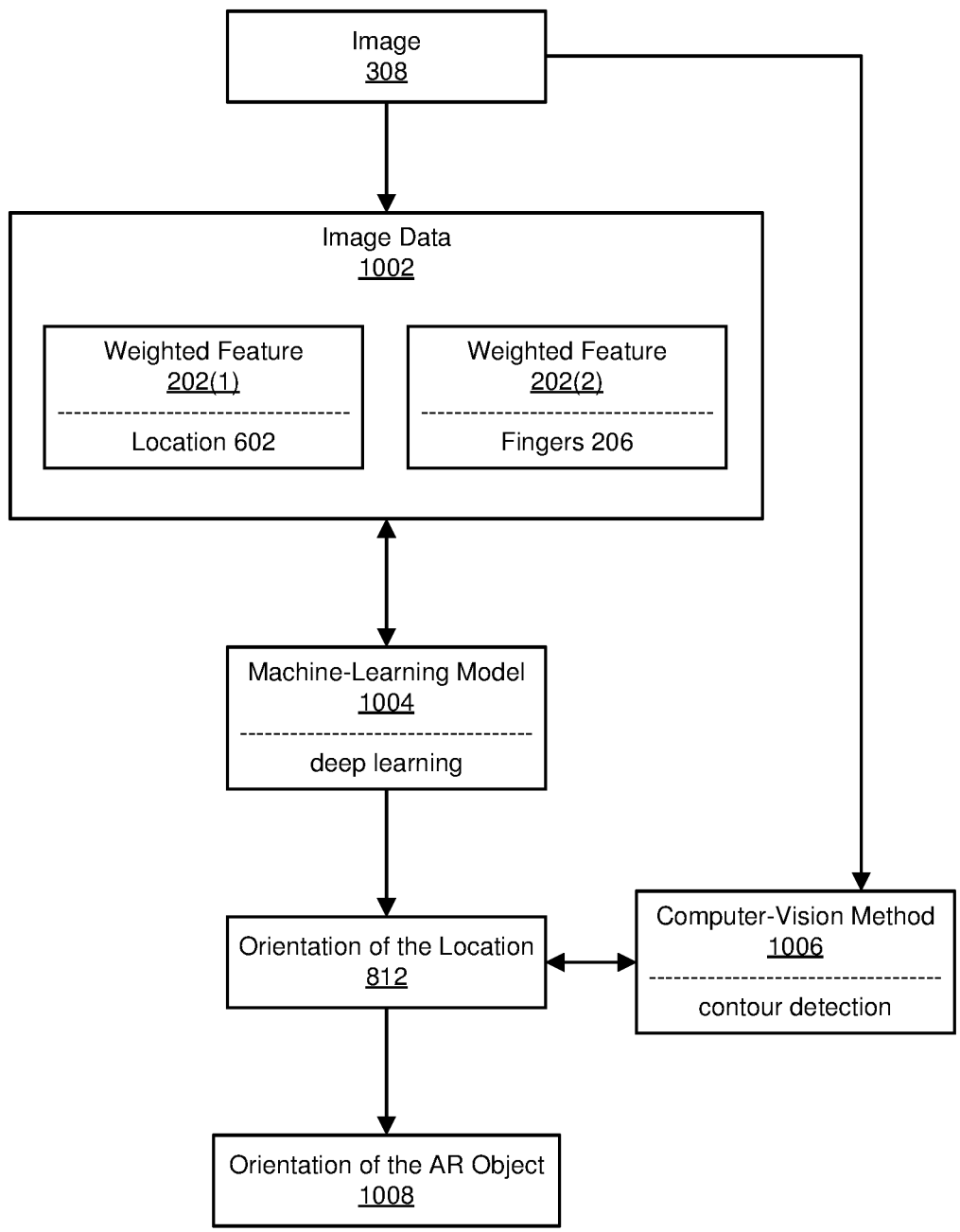
FIG. 10 is a block diagram of an exemplary calculation of an orientation of a location to place an augmented-reality object.

As shown in FIG. 10, a machine-learning model 1004 may use deep learning to annotate image data 1002, derived from image 308, with weighted features 202(1) and 202(2), which may include location 602. In other examples, machine-learning model 1004 may label image data 1002 with rotation angles to estimate the angle of user's hand 306. By annotating image data 1002, augmented-reality system 300 may apply machine-learning model 1004 to localize user's hand 306 and location 602 for asset placement. In other words, augmented-reality system 300 may focus on tracking the local area around location 602 instead of an entire hand. Machine-learning model 1004 may then estimate orientation of the location 812 based on the analysis of image data 1002 and on continuously learning from updated image data as user's hand 306 moves. In some embodiments, machine-learning model 1004 may also improve matching user's hand 306 with silhouette model 200 and/or accurately identifying location 602 within image 308.

Additionally, a computer-vision method 1006 may improve the calculation of orientation of the location 812 based on continuously updated feedback on image 308 of user's hand 306. In the example of FIG. 10, computer-vision method 1006 may use contour detection to quickly track changes in the movement of user's hand 306 and update orientation of the location 812 accordingly. In other examples, methods like optical flow may be more accurate for slower movements while adaptive approaches may be more accurate for faster movements. Although illustrated as a single model, machine-learning model 1004 may represent multiple models or machine-learning methods combined to estimate orientation of the location 812. Similarly, computer-vision method 1006 may represent multiple methods combined to quickly pinpoint orientation of the location 812 using estimates from machine-learning model 1004.

In the above examples, augmented-reality system 300 may combine machine-learning model 1004 and computer-vision method 1006 to quickly and accurately calculate the current orientation of the location 812. For example, machine-learning model 1004 may model user's hand 306 using features such as knuckles and joints to determine general location 602 between the knuckle and the nearest joint of the ring finger. Computer-vision method 1006 may then track the boundaries of the ring finger to scale and orient user's hand 306 and location 602. As another example, machine-learning model 1004 may model features for other fingers to estimate the rotation of user's hand 306, and computer-vision method 1006 may determine the actual rotation of location 602 around the ring finger. Additionally, machine-learning model 1004 and/or computer-vision method 1006 may determine current hand rotation angles or placement based on the position of weighted features 202 being tracked by tracking module 806. Alternatively, these methods may track local pixels and colors of image 308 near location 602. By increasing the speed of determining orientation of the location 812, tracking module 806 may adjust to higher frame rates in video processing without substantial lag.

In some embodiments, tracking module 806 may begin tracking after the user selects location 602 for augmented-reality object 702. In these embodiments, tracking module 806 may particularly track a local area around the selection. In other embodiments, tracking module 806 may begin tracking after matching module 802 determines image 308 of user's hand 306 matches silhouette model 200. Additionally or alternatively, tracking module 806 may track location 602 based on an identified default location.

Returning to FIG. 1, at step 140, one or more of the systems described herein may display, by the augmented-reality system, the augmented-reality object on the user's hand based on the orientation of the location on the user's hand. For example, a display module 808 may, as part of augmented-reality system 300 in FIG. 8, display augmented-reality object 702 on user's hand 306 based on orientation of the location 812.

The systems described herein may perform step 140 in a variety of ways. In one embodiment, display module 808 may display augmented-reality object 702 on user's hand 306 by matching an orientation of augmented-reality object 702 to orientation of the location 812 and displaying augmented-reality object 702, rotated to match orientation of the location 812, at location 602. In this embodiment, the orientation of augmented-reality object 702 may include a size of augmented-reality object 702, an angle of augmented-reality object 702, and/or a relative position of augmented-reality object 702.

Figure 7:
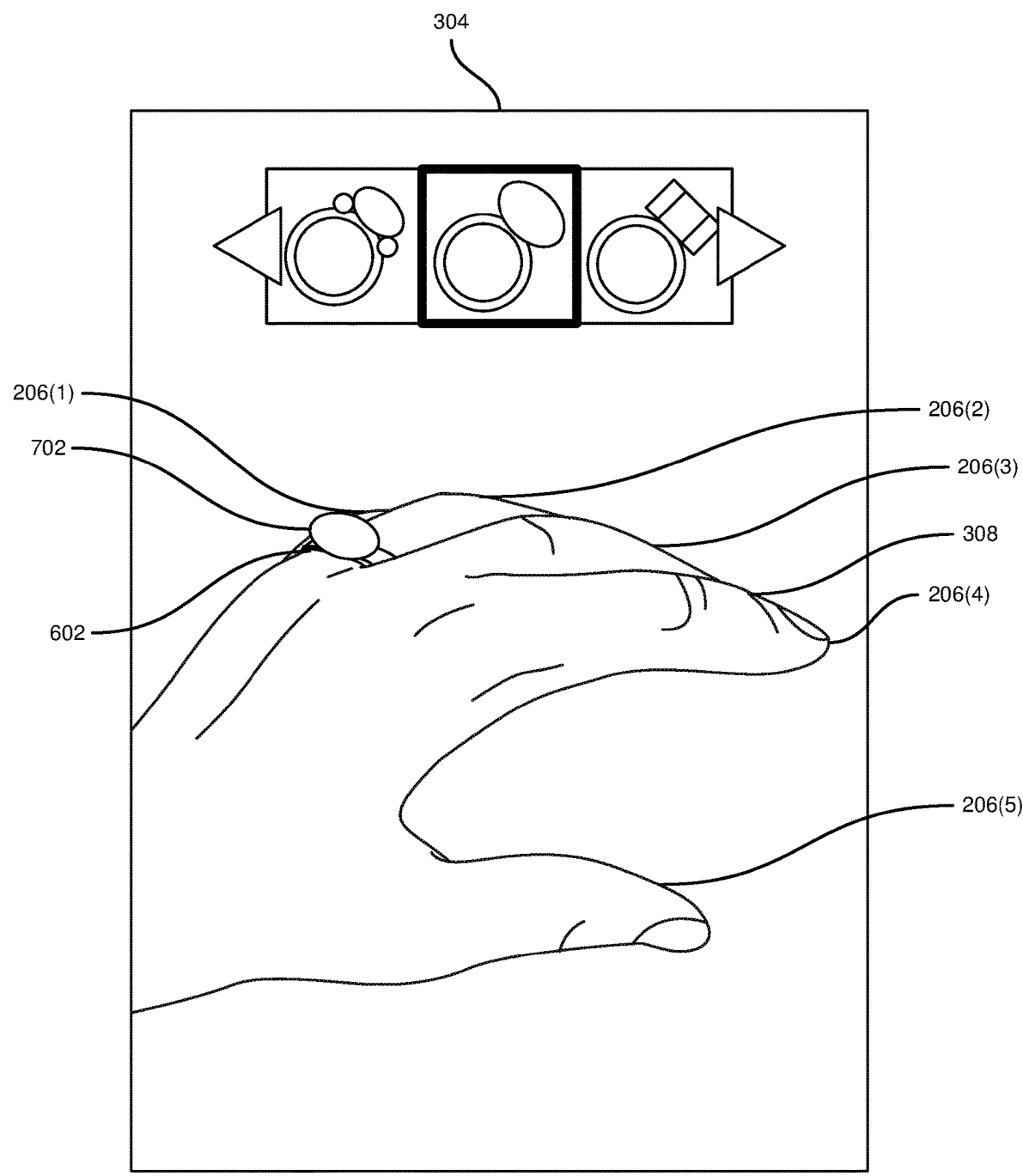
FIG. 7 illustrates an exemplary display of an exemplary augmented-reality object on a user's hand.

As shown in FIG. 10, augmented-reality system 300 may directly calculate an orientation of the augmented-reality object 1008 from orientation of the location 812. As illustrated in FIG. 7, augmented-reality object 702 may appear at location 602 and adjust to the orientation of location 602 based on image 308 displayed on visual display 304. In this example, augmented-reality system 300 may track the orientation of finger 206(2) to determine the orientation of augmented-reality object 702 when placed on finger 206(2). Furthermore, in the example of FIG. 7, multiple augmented-reality objects may be displayed to the user to select the current object and/or alternate between the objects. Additionally, other information about each augmented-reality object, such as the price and/or the popularity of each object, may be optionally displayed or selected for display.

In some examples, an animation of augmented-reality object 702 may gradually appear and/or disappear on visual display 304 to prevent jarring, sudden changes due to issues such as occlusion of location 602. For example, if finger 206(2) of FIG. 7 is sometimes occluded by the middle finger in image 308, the ring may slowly disappear and reappear to avoid flickering images.

As explained above in connection with method 100 in FIG. 1, the disclosed systems and methods may, by using a metric to increase weighting for structurally important regions, improve the tracking of an anatomical feature, such as a user's hand, for accurately displaying augmented-reality objects. Specifically, the disclosed systems and methods may first predefine a silhouette model with important features to use in tracking a user's hand. By prompting the user to match their hand to the silhouette model, the systems and methods described herein may identify the locations of the important features on the user's hand for further tracking. Additionally, the silhouette model may guide the user so that the appearance of an augmented-reality object is not surprising. Next, the disclosed systems and methods may select a location or prompt the user to select a location for displaying the augmented-reality object.

The systems and methods described herein may then track the location on the user's hand as the user moves their hand in order to determine the orientation of the user's hand and, therefore, the orientation to adjust the augmented-reality object. In some examples, the systems and methods described herein may use a combination of machine-learning models and computer-vision methods to accurately and quickly calculate the orientation as the user's hand is moving. For example, machine learning may be robust but slow to adjust to changes and movement and may not localize features precisely. In contrast, computer-vision methods may provide accurate estimates but may not be robust alone. The combination of machine learning and computer vision may reduce error due to hand movement and/or differences in hand shapes and reduce the need to repeatedly determine the location of the augmented-reality object. Furthermore, by orienting the augmented-reality object to match the orientation of the user's hand, the disclosed systems and methods may improve the appearance of augmented-reality objects to match real-world constructs. Thus, the systems and methods described herein may improve the accuracy, robustness, and speed of displaying augmented-reality objects.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data, output a result of the transformation to a visual display, use the result of the transformation to calculate the orientation of an augmented-reality object, and store the result of the transformation to an augmented-reality system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   matching, by at least one camera of an augmented-reality system, a user's hand with a predefined silhouette model with weighted features, wherein the weighted features comprise anatomical features of the user's hand that are weighted with greater weight than other anatomical features;
   identifying a location on the user's hand to place an augmented-reality object;
   tracking, by the augmented-reality system, the location on the user's hand and an orientation of the location on the user's hand by tracking a movement of the weighted features on the user's hand; and
   displaying, by the augmented-reality system, the augmented-reality object on the user's hand based on the orientation of the location on the user's hand.

2. The method of claim 1, wherein the augmented-reality system comprises at least one of:
   a mobile computing device;
   the camera; or
   a visual display.

3. The method of claim 1, wherein the weighted features comprise regions of the silhouette model with greater weight than other regions used to calculate an accuracy of matching the user's hand with the silhouette model, wherein a weighted feature comprises at least one of:
   the location on the user's hand to place the augmented-reality object;
   a contour of the silhouette model; or
   an expected anatomical feature of the user's hand.

4. The method of claim 3, wherein the weighted feature comprises a finger of the user's hand selected as the location on the user's hand and weighted with greater weight than other fingers of the user's hand.

5. The method of claim 1, wherein matching the user's hand with the silhouette model comprises:
   prompting, from the augmented-reality system, the user to position the user's hand to match the silhouette model; and
   detecting that the user's hand matches the silhouette model within a predefined accuracy rating.

6. The method of claim 5, further comprising prompting the user to improve the match between the user's hand and the silhouette model to meet the predefined accuracy rating.

7. The method of claim 1, wherein matching the user's hand with the silhouette model comprises:
   applying the silhouette model as a mask to an image of the user's hand; and
   identifying an area of the image comprising the user's hand within the mask.

8. The method of claim 1, wherein identifying the location on the user's hand comprises:
   prompting the user to select the location to place the augmented-reality object; and
   detecting the selection of the location.

9. The method of claim 8, wherein the selection of the location comprises at least one of:
   a selection of the location on an image of the user's hand on a visual display of the augmented-reality system; or
   a motion by the user's other hand to indicate the location on the user's hand.

10. The method of claim 1, wherein identifying the location on the user's hand comprises:
    identifying the augmented-reality object; and
    determining a default location to place the augmented-reality object based on a type of the augmented-reality object.

11. The method of claim 1, wherein tracking the orientation of the location on the user's hand comprises:

annotating image data captured by the augmented-reality system using a machine-learning model to estimate, based on the weighted features, the orientation of the location on the user's hand; and using a computer-vision method to refine the estimated orientation of the location on the user's hand.

12. The method of claim 1, wherein displaying the augmented-reality object on the user's hand comprises:

matching an orientation of the augmented-reality object to the orientation of the location on the user's hand; and displaying the augmented-reality object, rotated to match the orientation of the location on the user's hand, at the location on the user's hand.

13. The method of claim 12, wherein the orientation of the augmented-reality object comprises at least one of:

a size of the augmented-reality object;

an angle of the augmented-reality object; or a relative position of the augmented-reality object.

14. An augmented-reality system comprising:

a matching module, stored in memory, that matches, by at least one camera, a user's hand with a predefined silhouette model with weighted features, wherein the weighted features comprise anatomical features of the user's hand that are weighted with greater weight than other anatomical features;

an identification module, stored in memory, that identifies a location on the user's hand to place an augmented-reality object;

a tracking module, stored in memory, that tracks the location on the user's hand and an orientation of the location on the user's hand by tracking a movement of the weighted features on the user's hand;

a display module, stored in memory, that displays the augmented-reality object on the user's hand based on the orientation of the location on the user's hand; and at least one hardware processor that executes the matching module, the identification module, the tracking module, and the display module.

15. The augmented-reality system of claim 14, wherein the matching module matches the user's hand with the silhouette model by:

prompting, from the augmented-reality system, the user to position the user's hand to match the silhouette model; and detecting that the user's hand matches the silhouette model within a predefined accuracy rating.

16. The augmented-reality system of claim 14, wherein the matching module matches the user's hand with the silhouette model by:

applying the silhouette model as a mask to an image of the user's hand; and identifying an area of the image comprising the user's hand within the mask.

17. The augmented-reality system of claim 14, wherein the identification module identifies the location on the user's hand by:

prompting the user to select the location to place the augmented-reality object; and detecting the selection of the location.

18. The augmented-reality system of claim 14, wherein the identification module identifies the location on the user's hand by:

identifying the augmented-reality object; and determining a default location to place the augmented-reality object based on a type of the augmented-reality object.

19. The augmented-reality system of claim 14, wherein the tracking module tracks the orientation of the location on the user's hand by:

annotating image data captured by the augmented-reality system using a machine-learning model to estimate, based on the weighted features, the orientation of the location on the user's hand; and using a computer-vision method to refine the estimated orientation of the location on the user's hand.

20. A computer-readable medium comprising one or more computer-executable instructions that, when executed by at least one processor of a computing device, cause the computing device to:

match, by at least one camera of an augmented-reality system, a user's hand with a predefined silhouette model with weighted features, wherein the weighted features comprise anatomical features of the user's hand that are weighted with greater weight than other anatomical features;

identify a location on the user's hand to place an augmented-reality object;

track the location on the user's hand and an orientation of the location on the user's hand by tracking a movement of the weighted features of the user's hand; and display the augmented-reality object on the user's hand based on the orientation of the location on the user's hand.

* * * * *